Oct. 9, 1962   R. E. McCANN ETAL   3,057,442
DRUM WITH FLOATING BRAKE FLANGE
Filed May 18, 1960   2 Sheets-Sheet 1

INVENTORS
JOHN R. REEVE, JR. &
ROBERT E. McCANN
BY
ATTORNEYS

Oct. 9, 1962   R. E. McCANN ETAL   3,057,442
DRUM WITH FLOATING BRAKE FLANGE
Filed May 18, 1960   2 Sheets-Sheet 2

INVENTORS
JOHN R. REEVE, JR. &
ROBERT E. McCANN
BY
ATTORNEYS

# United States Patent Office 3,057,442
Patented Oct. 9, 1962

3,057,442
DRUM WITH FLOATING BRAKE FLANGE
Robert E. McCann and John R. Reeve, Jr., Pampa, Tex., assignors to Cabot Corporation, Boston, Mass., a corporation of Delaware
Filed May 18, 1960, Ser. No. 29,914
1 Claim. (Cl. 188—218)

This invention comprises a new and improved brake flange structure for hoisting, windless or winch drums so constructed and arranged as to have complete freedom for cylindrical expansion without imparting stress to the drum or being in any way distorted when frictionally heated. While the invention has a particularly useful application to hoisting drums employed in the oil producing industry, it is of general utility wherever frictional braking of a drum is required.

Brake flanges are used in conjunction with brake bands to absorb energy and provide reliable means for stopping the rotation of a drum when raising or lowering a load with a block and wire line system. The brake flange will be heated by friction during this operation and will materially expand. If the flange is attached at one edge to the drum by bolting or welding, its attached edge is restrained from free expansion. Such a connection will result in a conical expansion effect in the brake flange and so disturb a level surface grip of the brake band. The braking operation is therefore reduced and rendered uncertain and independable. An important feature of the present invention comprises a brake flange mounting which will permit the free circumferential expansion of the flange under all working conditions of frictional heating.

Another important advantage of the present invention is that it permits ready detachment and replacement of the brake flange and so not only facilitates manufacture but makes available an assortment of brake flanges of different sizes for use in combination with the hoisting drum. If a given drum head can accommodate more than one size of brake flange, its utility is increased to the manufacturer.

Other features of the invention consist in improved cooling provision for the brake flange. To that end, the flange is so constructed as to present an unobstructed surface defining its internal diameter and contributing to the formation of a continuous passage for cooling water across the entire inside surface of the flange. As herein shown, this is supplemented by providing the flange with ventilating ribs or vanes arranged to create copious air flow directed toward the heated portion of the brake flange.

These and other features of the invention will be best understood and appreciated from the following description of a preferred embodiment thereof selected for purposes of illustration and shown in the accompanying drawings in which.

Figures 2, 3:
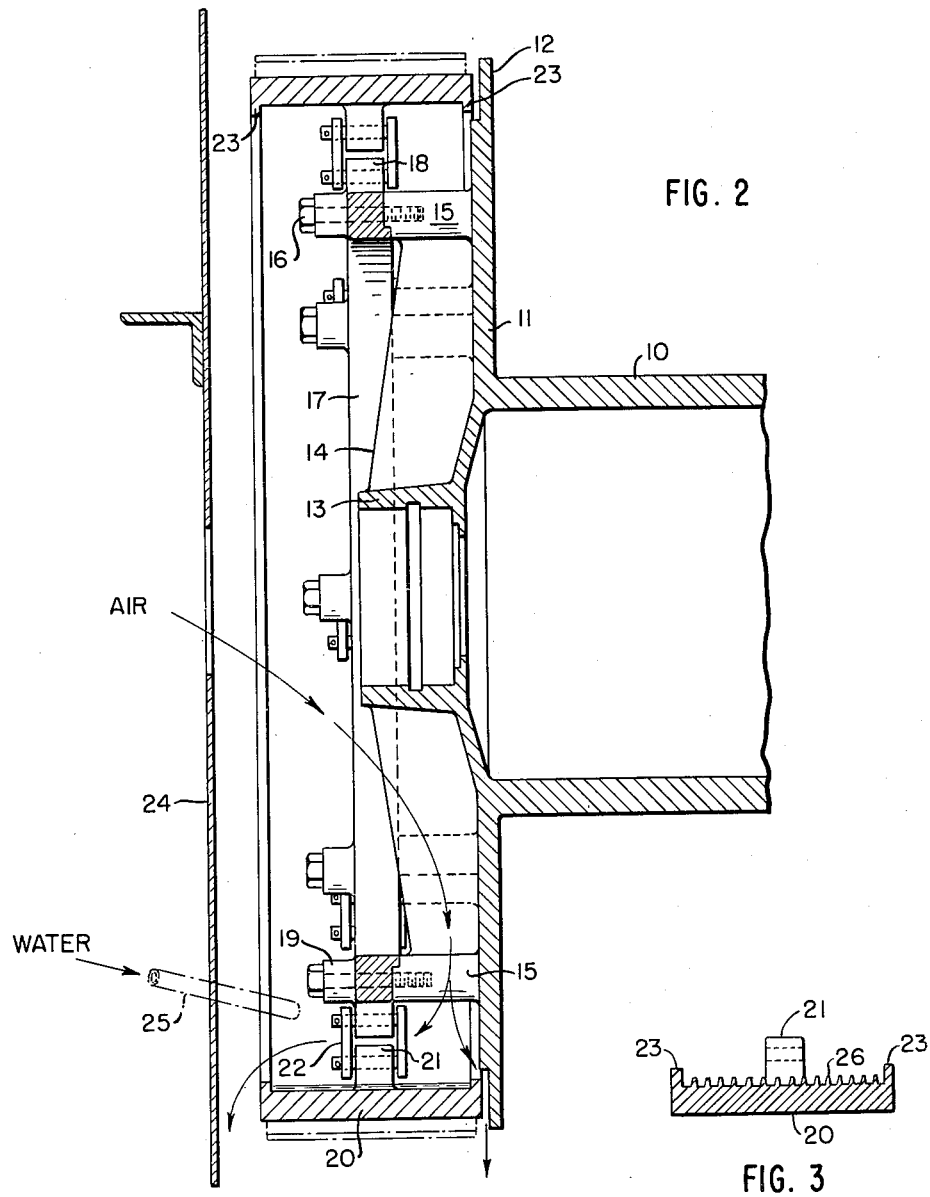
FIG. 2 is a sectional view on the line 2—2 of FIG. 1.
FIG. 3 is a cross-sectional view showing a brake flange of modified form.

In FIG. 2 is shown a portion of the barrel 10 of a conventional hoisting drum formed integrally with a disc-shaped head 11. The marginal area of the head 11 is rabbeted or reduced in its outer surface to provide a circumferential outlet for cooling air as will presently appear. The drum is formed integrally with a hub 13 from which extends a series of radial reinforcing and ventilating ribs 14.

Figure 1:
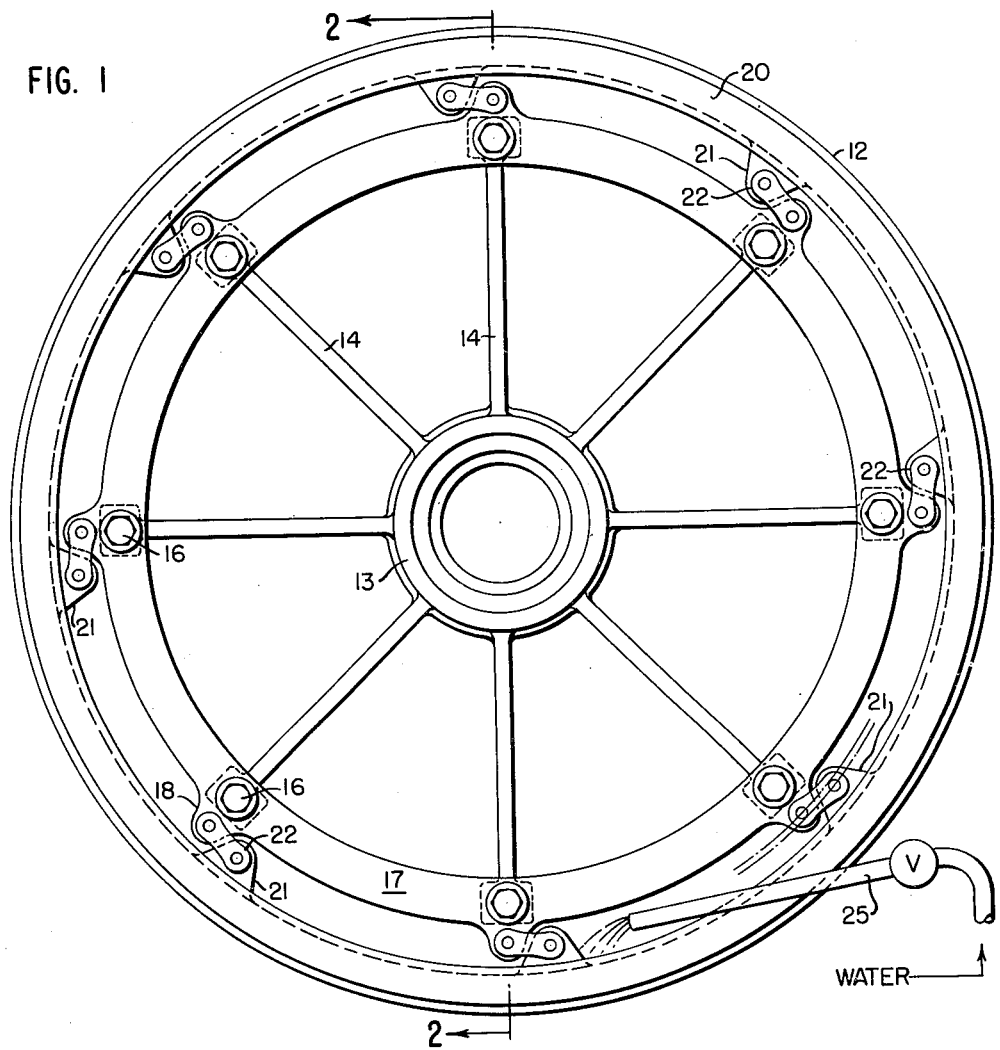
FIG. 1 is a view of the drum and brake flange in end elevation.

The head 11 is provided with a series of outwardly projecting bosses 15 and these are drilled and tapped to receive bolts 16. An adapter ring 17 is secured by the bolts 16 to the outer ends of the bosses 15 which as shown in FIG. 1 are spaced 45° apart in the bolt circle. The adapter ring in turn is provided with bosses 19 which are drilled together with the ring to receive the bolts 16. The adapter ring 17 is also provided with a series of outwardly projecting radial lugs 18, one of which is located opposite to each of the reinforcing ribs 14.

The brake flange 20 has an outer cylindrical friction surface which is engaged by the brake band suggested in dot and dash lines in FIG. 2. Upon its inner surface, the brake flange 20 is provided with a series of inwardly projecting lugs 21, one adjacent to each of the outwardly extending radial lugs 18 of the adapter ring 17. The brake flange 20 is connected to the adjuster ring assembly by means of double links 22 having pivot pins which extend through the lugs 18 and 21. The circles on which these two sets of pivot pins are located vary in diameter, the circle of the pins in the lugs 18 of the adjuster ring being somewhat less in diameter than the circle of the pins located in the lugs 21 of the brake flange and it will be seen that the brake flange is thus suspended for free expansion, this being absorbed by slight motion of the links 22. Further, it may be seen that by varying the length of the lugs 21 or by varying the link length 22, different diameter brake rings may be used with the same drum structure and adapter. The lugs 21 are located midway between the side edges of the brake rim or flange 20. The rim 20 symmetrically encloses the adapter ring 17 and connecting links 22.

Provision is made for cooling the brake flange 20 both by water and air. To this end, a suitable shield 24 having a central aperture is mounted adjacent to the outer end of the brake flange. This shield operates to direct the air current developed by the ventilating ribs 14 toward the circumferential outlet passage provided at the circumference of the brake flange by the rabbeted section of the head 11 and by the shield 24. A pipe 25 is also provided which delivers cooling water to the interior of the brake flange where it is distributed uniformly upon the unobstructed inside surface of the flange. The brake flange 20 is fitted with water retaining lips 23 to minimize cooling water loss during rotation. The lugs 21 are spaced 45° apart on the inner surface of the flange 20 and so are separated by surface areas wherein the flow of cooling water across the flange is unobstructed. In order to insure a maximum rate of heat transfer from the brake flange 20 to the flow of cooling air or water, the inner surface of the brake flange is provided with circumferential serrations 26, typically illustrated in FIG. 3, to increase the surface area without obstructing the surface.

It is of course apparent that in operation the brake band exerts a powerful drag on the brake flange. The circumferentially spaced link system of our invention is entirely adequate to hold the brake flange securely balanced in place against this drag and to prevent any displacement of the flange which would unfavorably affect the braking action of the band or the retarding action of the flange on the drum.

Having thus disclosed our invention and described in detail an illustrative embodiment thereof, we claim as new and desire to secure by Letters Patent:

A brake drum having a hub and a circular head at one end, radial vanes projecting from the head, an adapter ring bolted to the outer end of each vane and having an outwardly projecting lug opposite each point of bolt connection with one of said vanes, a brake rim symmetrically and concentrically enclosing said adapter ring and said lugs and having internal lugs equally spaced from its opposite edges, and links also symmetrically enclosed within said brake rim and connecting the lugs of the adapter ring with the internal lugs of the brake rim, said links extending in a substantially circumferential direction within the brake rim and holding the latter in spaced relation with respect to the adapter ring.

References Cited in the file of this patent

UNITED STATES PATENTS

| | | |
|---|---|---|
| 1,613,680 | Timbs | Jan. 11, 1927 |
| 1,786,132 | Schwemlein | Dec. 23, 1930 |
| 1,874,625 | Rice | Aug. 30, 1932 |
| 1,949,553 | Tremolada | Mar. 6, 1934 |
| 2,753,959 | Johnson | July 10, 1956 |

FOREIGN PATENTS

| | | |
|---|---|---|
| 1,099,546 | France | Mar. 23, 1955 |